United States Patent [19]
Jaskie et al.

[11] Patent Number: 5,067,829
[45] Date of Patent: Nov. 26, 1991

[54] DYNAMIC OPTICAL BEAM STEERING

[75] Inventors: James E. Jaskie, Scottsdale; Michael S. Lebby, Chandler; Fred V. Richard, Scottsdale, all of Ariz.

[73] Assignee: Motorola, Inc., Schaumburg, Ill.

[21] Appl. No.: 579,513

[22] Filed: Sep. 10, 1990

[51] Int. Cl.$^5$ .............................................. G02B 6/10
[52] U.S. Cl. ............................................ 385/8; 385/9; 385/10; 385/130; 385/131
[58] Field of Search .................... 350/96.11–96.15, 350/96.29, 96.30, 355, 356

[56] References Cited
U.S. PATENT DOCUMENTS

| | | | |
|---|---|---|---|
| 4,240,696 | 12/1980 | Tracy et al. | 350/355 |
| 4,605,946 | 8/1986 | Kato et al. | 350/355 |
| 4,786,128 | 11/1988 | Birnbach | 350/96.14 |

*Primary Examiner*—Georgia Epps
*Attorney, Agent, or Firm*—Joe E. Barbee

[57] ABSTRACT

A system for dynamically steering a light beam alters the path of a light beam using refraction. The light beam passes through multiple layers of optically transparent elastic material. Electrodes are attached to the bottom and top surfaces of the optically transparent layers. Voltages applied to the electrodes cause the optically transparent layers to deform. This deformation causes a change in the angle at which the light beam intercepts the surfaces of the optically transparent layers. The light beam is refracted based upon the angle of intercept and the index of refraction of the optically transparent layers. The direction of travel of the light beam can thus be controlled by varying the voltages across the electrodes.

18 Claims, 2 Drawing Sheets

DYNAMIC OPTICAL BEAM STEERING

BACKGROUND OF THE INVENTION

The present invention relates, in general, to directional control of optical emissions, and more particularly, to a system for dynamically steering a light beam toward a remote reception point.

Speed and power requirements, as well as technological advances, have increased the use of optics in electronic systems. The adaptation of optical interconnection to computer systems has precipitated an increasing requirement to be able to control the path of a light beam. Such applications as reconfigurable optical interconnection, optical switching, or self-aligning laser systems, such as a compact disc player, would benefit from such an ability.

Previously, means of directing a light beam toward a remote reception point, such as a sensor, a receiver, a waveguide, or an optical fiber, consisted primarily of reflecting the beam using a multi-position mirror, or diffracting the beam using a multi-position holographic element. In one such approach, a mirror was driven by a motor which changed the orientation of the mirror. A light beam aimed at the surface of the mirror was thus reflected in a direction determined by the angle of incidence upon the mirror. Another approach utilized a linear motor to change the position of a holographic scanner relative to the light beam. The angle at which the light beam was diffracted by the holographic scanner was thus changed.

Still another approach toward steering a light beam again relied upon reflection from a mirrored surface. In this case, an optical switch was built by having the mirrored surface assume one of two positions. The first position directed the beam of light toward a fiber optic receptor. The second position directed the beam of light away from the receptor. The mirrored surface was supported upon a silicon pedestal about which it could pivot. Under each end of the mirrored surface was located an electrode. A potential applied between the mirrored surface and one electrode caused the mirrored surface to pivot toward the electrode. A potential applied between the mirrored surface and the other electrode caused the mirrored surface to pivot back toward the other electrode. This established the two positions for the optical switch.

The prior art was subject to a number of limitations. Solutions involving motors could not be integrated upon a silicon chip. Mechanical couplings reduced the reliability of the electronic systems. The optical switch was limited to two positions, and also involved deforming silicon, which opened up the possibility of structural failure during operation.

SUMMARY OF THE INVENTION

The objects and advantages of the present invention are provided by a method of dynamically steering a light beam. The light beam passes through multiple layers of optically transparent elastic material. Electrodes are attached to the bottom and top surfaces of the optically transparent layers. Voltages applied to the electrodes cause the optically transparent layers to deform. This deformation causes a change in the angle at which the light beam intercepts the surfaces of the optically transparent layers. The light beam is refracted based upon the angle of intercept and the index of refraction of the optically transparent layers. The direction of travel of the light beam can thus be controlled by varying the voltages across the electrodes.

DETAILED DESCRIPTION OF THE DRAWINGS

The present invention takes advantage of the fact that light is refracted when it passes through the interface between two optically transparent layers with different refractive indices. Snell's Law states:

$$n_1 \sin\theta_1 = n_2 \sin\theta_2$$

where $n_1$ is the refractive index of the first layer, $n_2$ is the refractive index of the second layer, $\theta_1$ is the angle at which the light beam intercepts the interface between the two layers, measured relative to the normal, and $\theta_2$ is the angle at which the light beam emerges from the interface, measured relative to the normal. Note that if $n_2$ is less than $n_1$, $\sin\theta_2$ must be greater than $\sin\theta_1$, i.e., the light beam is refracted away from the normal. Note also that when the light beam intercept is normal to the interface, $\theta_1=0$, $\sin\theta_1=0$, and therefore $\sin\theta_2=0$. Thus $\theta_2=0$ and no refraction takes place.

Figure 1:
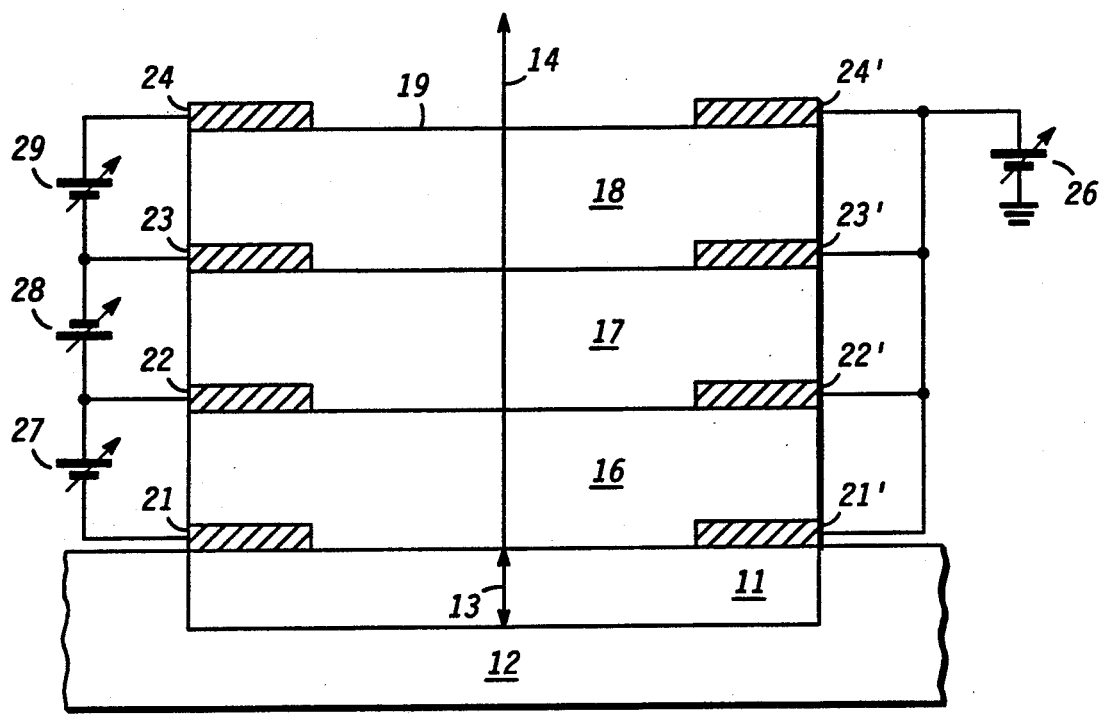
FIG. 1 illustrates a cross-section of an embodiment of the present invention under non-biased conditions, coupled to a semiconductor laser.

FIG. 1 illustrates a cross-section of an embodiment of the present invention coupled to a semiconductor laser. The semiconductor laser comprises laser generation region 11 within substrate 12. Stimulated light ray 13 emerges from laser generation region 11 as light beam 14. Optically transparent layers 16, 17, and 18, having refractive indices $n_1$, $n_2$, and $n_3$, respectively, are made from soft elastic materials. In a preferred embodiment, the materials are polymers of silicone, such as PS2067 ultraviolet curable thin film silicone coating, or PEM25 clean grade liquid silicone elastomer, available from Petrarch Systems of Bristol, Pennsylvania. Layers 16, 17, and 18 may be polygonal, circular, oval, or of any other curvilinear configuration. Layers 16, 17, and 18 are stacked on top of each other such that each layer has a lower refractive index than the layer beneath it. Different refractive indices are obtained either by using different materials for each layer, or by making the material of each layer a different density.

Top surface 19 of layer 18 is made to be rigidly planar. If the material from which the optically transparent layers are made is an elastic polymer, this can be accomplished by curing top surface 19 with ultraviolet light. Alternately, a thin layer of rigid planar material, such as glass, can be used to coat top surface 19, forcing it to hold a planar shape. The semiconductor laser is coupled to layer 16 such that light beam 14 must pass through layers 16, 17, and 18. Under non-biased conditions, light beam 14 passes through layers 16, 17, and 18 at an angle normal to the interface between layers 16 and 17, the interface between layers 17 and 18, and top surface 19.

Thus, no refraction takes place. Note that the bottom surface of layer 16 is coupled to the semiconductor laser such that the bottom surface of layer 16 maintains substantial planarity.

Electrodes are positioned atop, beneath, and between layers 16, 17, and 18 near the edges of layers 16, 17, and 18. Electrodes may be made of any appropriate material. However, electrodes which are made using indium tin oxide have the advantage of being transparent to the light beam. Electrodes 21 and 21' are attached to the bottom surface of layer 16. Electrodes 22 and 22' are attached between layers 16 and 17. Electrodes 23 and 23' are attached between layers 17, and 18. Electrodes 24 and 24' are attached atop layer 18. The electrodes are positioned and aligned so as to form electrode pairs separated by layers 16, 17, or 18. Thus electrodes 21 and 22 form an electrode pair, as do electrodes 22 and 23, 23 and 24, 21' and 22', 22' and 23', and 23', and 24'.

Variable voltage source 26 is coupled to electrodes 21', 22', 23', and 24'. In FIG. 1, voltage source 26 is set to zero volts, and thus there is no potential applied to electrodes 21', 22', 23.' and 24'. Therefore there is no effect by electrodes 21', 22', 23.' and 24' upon layers 16, 17 and 18. Variable voltage sources 27, 28, and 29 are coupled across electrodes 21 and 22, 22 and 23, and 23 and 24, respectively. In FIG. 1, voltage sources 27, 28, and 29 are also set to zero volts, so there is no effect by electrodes 21, 22, 23, and 24 upon layers 16, 17 and 18. Thus, there is substantially no variation in the thickness of layers 16, 17, and 18. Light beam 14 therefore intercepts each layer normal to the interfaces between the layers, and no refraction takes place. Variable voltage sources 26, 27, 28, and 29 represent any means by which different voltages are applied to electrodes 21, 22, 23, 24, 21', 22', 23', and 24'.

Figure 2:
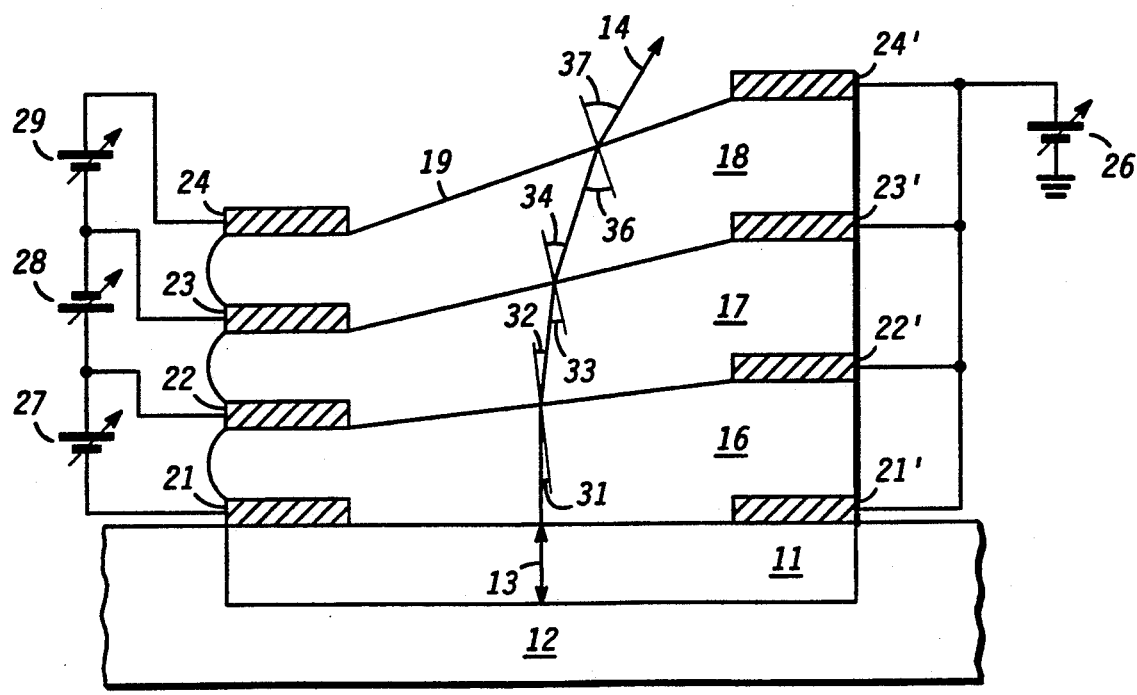
FIG. 2 illustrates a cross-section of the embodiment of FIG. 1 under biased conditions, coupled to a semiconductor laser.

In FIG.2, variable voltage source 26 is set to a non-zero value, and a potential is thus applied to each of electrodes 21', 22', 23', and 24'. Since there are no potential differences among electrodes 21', 22', 23', and 24', the charge on each of these electrodes is the same. There will therefore be some repulsion between electrode pairs 21' and 22', 22' and 23', and 23' and 24'. The higher the voltage of voltage source 26, the greater the repulsion is. This repulsion will tend to cause soft, optically transparent layers 16, 17, and 18 to thicken in the vicinity of electrodes 21', 22', 23' and 24' as the electrodes attempt to move apart.

A difference in charge polarity existing between two electrodes causes the two electrodes to attract one another. The effect of voltages in the range of five volts to twenty volts applied across electrodes 21 and 22, 22 and 23, and 23 and 24 is illustrated in FIG. 2. The polarity of the voltage of variable voltage source 28 is reversed relative to the polarity of variable voltage sources 27 and 29. Electrode 22 has a positive charge while electrode 21 has a negative charge. Electrodes 21 and 22 thus attract one another, squeezing layer 16 between them. Layer 16 becomes thinner in the vicinity of electrodes 22 and 21. This causes a slope in the interface between layers 16 and 17. The angle at which light beam 14 intercepts the interface between layers 16 and 17 is changed to angle 31, and light beam 14 is refracted such that $$\sin\theta_{12} = (n_2/n_1)(\sin\theta_{11})$$

where $\theta_{11}$ is angle 31 and $\theta_{12}$ is angle 32, the angle at which light beam 14 emerges from the layer 16/17 interface. Similarly, electrode 23 has a negative charge, causing electrodes 22 and 23 attract one another, squeezing layer 17 between them. This causes a slope in the interface between layers 17 and 18. The angle at which light beam 14 intercepts the interface between layers 17 and 18 is changed to angle 33. Light beam 14 is again refracted such that $$\sin\theta_{22} = (n_3/n_2)(\sin\theta_{21})$$

where $\theta_{21}$ is angle 33 and $\theta_{22}$ is angle 34, the angle at which light beam 14 emerges from the layer 17/18 interface. Finally, electrode 24 is positively charged, and therefore electrodes 23 and 24 attract one another, squeezing layer 18 between them, causing a slope in top surface 19. The angle at which light beam 14 intercepts top surface 19 is changed to angle 36. Light beam 14 is once more refracted such that $$\sin\theta_{32} = (n_4/n_3)(\sin\theta_{31})$$

where $\theta_{31}$ is angle 36, $\theta_{32}$ is angle 37, the angle at which light beam 14 emerges from top surface 19, and $n_4$ is the refractive index of the medium adjacent to top surface 19, normally air. If the polarities of voltage sources 27, 28, and 29 are all reversed, i.e., 27 and 29 becomes negative and 28 becomes positive, the results are the same.

If layers 16, 17, and 18 are all made of identical material with the same refractive index, all refraction takes place at top surface 19. In such a case, the deformation of layers 16, 17, and 18 contributes to the final value of angle 36, but does not contribute any refraction at the respective interfaces.

By independently varying voltages 27, 28, and 29, light beam 14 can be steered through a wide angle, though in only one direction relative to the normal. If electrodes 21', 22', 23' and 24' are connected to independent voltage sources in place of voltage source 26, light beam 14 can be steered in two directions relative to the normal. The maximum angle through which light beam 14 can be steered can be varied by using different numbers of optically transparent layers and by using materials of varying refractive indices. The amount of refraction imparted by each layer is a function of several variables. The softness of optically transparent layers 16, 17, and 18 determines how much each layer will deform in response to a given force. The force each pair of electrodes exerts upon a layer is determined by the dielectric constant of the layer, the thickness of the layer, the size of the electrodes, and the voltage applied between the electrodes.

It should be noted that reflections can occur at the interface between two optically transparent layers having different refractive indices. This can be eliminated by applying an appropriate dielectric anti-reflection coating between each layer, and upon top surface 19.

Figure 3:
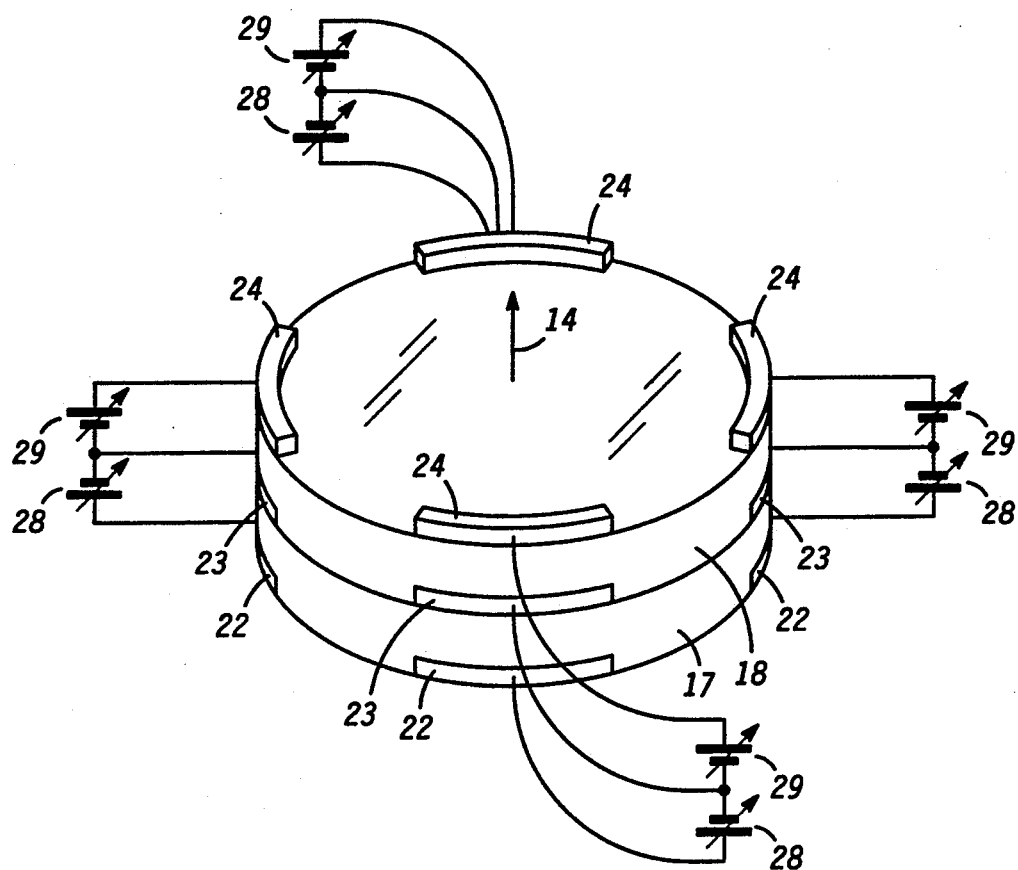
FIG. 3 illustrates an alternate embodiment of the present invention.

FIG. 3 illustrates an additional embodiment of the present invention which opens an additional dimension to the direction which light beam 14 may be steered. In this embodiment, only two optically transparent layers, 17 and 18, are used. Layers 17 and 18 are of a circular configuration. Electrodes 22 are attached around the periphery of the bottom surface of layer 17. Electrodes 24 are attached around the periphery of top surface 19, aligned to electrodes 22. Electrodes 23 are attached around the periphery of the interface between layers 17 and 18, aligned to electrodes 22 and 24. Independent voltage sources 28 are connected between each pair of electrodes 22 and 23, while independent voltage sources 29 are connected between each pair of electrodes 23 and 24. Light beam 14 can be steered in any direction within a circle, the limits of which are defined by the indices of refraction of layers 17 and 18, and the maximum displacement which voltage sources 28 and 29 can impart to the surfaces of layers 17 and 18.

Figure 4:
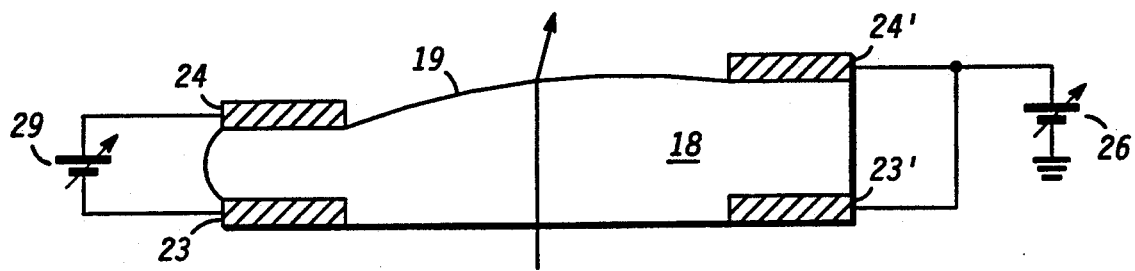
FIG. 4 illustrates an additional alternate embodiment of the present invention, showing the effect of a non-rigid top surface.

FIG. 4 illustrates an additional alternate embodiment of the present invention. In this case only one optically transparent layer, 18, is used. In this case, total steering range is limited. To counter this limitation, the refractive index of layer 18 is maximized. Also, note that top surface 19 of layer 18 is slightly bowed. In addition to the attraction between electrodes 23 and 24, causing the slope in surface 19 which provides for the refraction of light beam 14, there is also some attraction between electrodes 24 and 24'. If surface 19 is not held rigidly planar as in FIG. 1, this attraction causes the slight bow in surface 19. The slight bow acts as a lens, and has use in certain applications.

By now it should be appreciated that there has been provided a unique means for steering a beam of light. The light beam passes through layers of optically transparent polymers, refracting as it passes through surfaces at the interfaces of different layers at angles determined by voltages applied to electrodes connected to the edges of the layers. The path of the light beam can be continuously varied by varying the voltages across the electrodes.

We claim:

1. A dynamic optical beam steering means, comprising:
   a light source which emits a beam of light in a predetermined path;
   at least one optically transparent layer of elastic material, having a bottom surface and a top surface, the at least one optically transparent layer being placed in the path of the beam of light;
   at least one first electrode attached to at least a portion of the bottom surface of the at least one optically transparent layer; and
   at least one second electrode attached to at least a portion of the top surface of the at least one optically transparent layer, the at least one second electrode being substantially aligned with the at least one first electrode, such that when a voltage is applied to the at least one first and at least one second electrodes, the layer of elastic material will deform.

2. The dynamic optical beam steering means of claim 1, wherein the elastic material is a silicone polymer.

3. The dynamic optical beam steering means of claim 1, wherein the beam of light enters the at least one optically transparent layer through the bottom surface, travels through the at least one optically transparent layer, and exits through the top surface, the direction of travel of the beam of light being altered according to the index of refraction of the at least one optically transparent layer and the angle at which the beam of light intercepts the bottom surface and the top surface.

4. The dynamic optical beam steering means of claim 3, wherein a voltage applied between the at least one first electrode and the at least one second electrode results in charges of opposite polarity upon at least one first electrode and the at least one second electrode, causing an attraction between the at least one first electrode and the at least one second electrode, the attraction producing a reduction in the thickness of the at least one optically transparent layer, the reduction causing a change in the angle at which the beam of light intercepts the top surface, which in turn alters the direction of the path of the beam of light.

5. The dynamic optical beam steering means of claim 4 wherein the top surface is made to be rigid, providing a planar surface through which the beam of light exits the at least one optically transparent layer.

6. The dynamic optical beam steering means of claim 4 wherein the top surface is elastic, providing for a lensing effect upon the beam of light as it exits the at least one optically transparent layer.

7. The dynamic optical beam steering means of claim 1 wherein the at least one optically transparent layer is a polygon having multiple sides, there being first and second electrodes associated with at least two of the multiple sides, each first electrode being coupled to its associated second electrode by a voltage source.

8. The dynamic optical beam steering means of claim 1 wherein the at least one optically transparent layer is a circle, there being first and second electrode pairs spaced about the circumference of the circle, each first electrode being coupled to its associated second electrode by an independent voltage source.

9. The dynamic optical beam steering means of claim 1 wherein the at least one optically transparent layer is a curvilinear shape, there being first and second electrode pairs spaced about the perimeter of the curvilinear shape, each first electrode being coupled to its associated second electrode by an independent voltage source.

10. A means for dynamically steering a light beam, comprising;
    a light source which emits a beam of light in a predetermined path;
    a plurality of optically transparent layers of elastic material stacked on top of each other, there at least being a top most layer and a bottom most layer, each layer having a top surface and a bottom surface, the plurality of optically transparent layers being placed in the path of the beam of light;
    a plurality of top most electrodes attached to the top surface of the top most layer;
    a plurality of bottom most electrodes attached to the bottom surface of the bottom most layer, each one of the plurality of bottom most electrodes aligning with one of the plurality of top most electrodes;
    a plurality of intermediate electrodes between each of the plurality of optically transparent layers, each one of the plurality of intermediate electrodes aligning with one of the plurality of bottom most electrodes and with one of the plurality of top most electrodes, thus forming a plurality of sets of aligned electrodes.

11. The means for dynamically steering a light beam of claim 10, wherein at least the top surface of the top most layer is made rigid, providing a substantially planar top most surface.

12. The means for dynamically steering a light beam of claim 10, wherein a common potential is applied to the top most, bottom most, and intermediate electrodes of at least a first one of the plurality of sets of aligned electrodes, the common potential causing the top most, bottom most, and intermediate electrodes of the at least a first one of the plurality of sets of aligned electrodes to repel one another, thus causing a thickening of each one of the plurality of optically transparent layers near the at least a first one of the plurality of sets of aligned electrodes.

13. The means for dynamically steering a light beam of claim 10, wherein voltages are applied to the top most, bottom most, and intermediate electrodes of at least a second one of the plurality of sets of aligned electrodes in such a manner as to cause to exist a difference in charge polarity between the top most, bottom most, and intermediate electrodes of the at least a second one of the plurality of sets of aligned electrodes, the difference in charge polarity causing the top most, bottom most, and intermediate electrodes of the at least a second one of the plurality of sets of aligned electrodes to attract one another, thus causing a decrease in the thickness of each one of the plurality of optically transparent layers near the at least a second one of the plurality of sets of aligned electrodes.

14. The means for dynamically steering a light beam of claim 13 wherein the periphery of the plurality of optically transparent layers is ringed by a plurality of sets of aligned electrodes.

15. The means for dynamically steering a light beam of claim 10 wherein the light beam is directed into the plurality of optically transparent layers through the bottom surface of the bottom most layer, passes at an angle through the top surface of each one of the plurality of optically transparent layers, and exits the plurality of optically transparent layers through the top surface of the top most layer, the direction of the path of the light beam being determined by the index of refraction of each one of the plurality of optically transparent layers and by the angle at which the light beam passes through the top surface of each one of the plurality of optically transparent layers, the angle being dynamically controlled by means of varying voltages applied to the pluralities of top most, bottom most, and intermediate electrodes.

16. A system for directing a beam of electromagnetic energy, comprising:
an electromagnetic source which emits an electromagnetic energy in a predetermined path;
at least first and second layers which are transparent to the beam of electromagnetic energy, the layers having top and bottom surfaces, the second layer being positioned on top of the first layer, the at least first and second layers being placed in the path of electromagnetic energy; and
a plurality of electrode pairs positioned around the periphery of the first and second layers, the plurality of electrode pairs being arranged so that each pair has an electrode on the top and on the bottom surface of each of the layers such that, when a difference in charge polarity exists across each pair of electrodes, the corresponding layer will deform in response to the electrical potential.

17. A method for dynamically steering a beam of light, comprising;
stacking a plurality of optically transparent layers of elastic material on top of each other, each one of the plurality of optically transparent layers having a top surface at a first angle relative to a bottom surface;
attaching electrodes to the periphery of the plurality of optically transparent layers above and below the plurality of optically transparent layers and between each one of the plurality of optically transparent layers;
directing a beam of light into the plurality of optically transparent layers on a predetermined path such that the beam of light passes through the bottom surface of each one of the plurality of optically transparent layers, through each one of the plurality of optically transparent layers, and through the top surface of each one of the plurality of optically transparent layers at a second angle; and
applying different voltages to the electrodes, causing the electrodes to attract or to repel each other, thus modifying the first angle, which in turn modifies the second angle, further altering the path of the beam of light based upon the indices of refraction of the plurality of optically transparent layers.

18. A method for dynamically steering a beam of light, comprising;
arranging a plurality of optically transparent layers on top of each other, each layer having a top surface and a bottom surface;
placing at least one first electrode on the top surface of each one of the plurality of optically transparent layers;
placing at least one second electrode on the bottom surface of each one of the plurality of optically transparent layers, the at least one second electrode substantially aligning with the at least one first electrode so that when a voltage is applied cross the at least one first electrode and the at least one second electrode, the angle of the top surfaces of the plurality of optically transparent layers in relationship to the bottom surfaces of the plurality of optically transparent layers is modified; and
providing a light source to emit a beam of light into the plurality of optically transparent layers so the beam of light is re-directed when the voltage is applied across the at least first and second electrodes.

* * * * *